(12) United States Patent
Eidloth et al.

(10) Patent No.: US 10,690,181 B2
(45) Date of Patent: Jun. 23, 2020

(54) ANGULAR CONTACT ROLLER BEARING AND METHOD AND DEVICE FOR THE ASSEMBLY THEREOF

(71) Applicant: Schaeffler Technologies AG & Co. KG, Herzogenaurach (DE)

(72) Inventors: Rainer Eidloth, Herzogenaurach (DE); Reinhard Rumpel, Rottendorf (DE); Heinrich Hofmann, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/741,517

(22) PCT Filed: Aug. 3, 2016

(86) PCT No.: PCT/DE2016/200353
§ 371 (c)(1),
(2) Date: Jan. 3, 2018

(87) PCT Pub. No.: WO2017/020905
PCT Pub. Date: Feb. 9, 2017

(65) Prior Publication Data
US 2018/0195553 A1    Jul. 12, 2018

(30) Foreign Application Priority Data
Aug. 4, 2015    (DE) .......................... 10 2015 214 847

(51) Int. Cl.
*F16C 19/36*    (2006.01)
*F16C 43/06*    (2006.01)
(Continued)

(52) U.S. Cl.
CPC .......... *F16C 19/364* (2013.01); *F16C 19/225* (2013.01); *F16C 33/366* (2013.01);
(Continued)

(58) Field of Classification Search
CPC ...... F16C 19/225; F16C 19/36; F16C 19/361; F16C 19/364; F16C 33/366;
(Continued)

(56) References Cited

U.S. PATENT DOCUMENTS

| 1,397,142 A | 11/1921 | Palmgren |
| 2,042,417 A | 5/1936 | Wise |

(Continued)

FOREIGN PATENT DOCUMENTS

| CH | 463886 A | 10/1968 |
| CN | 101270776 A | 9/2008 |

(Continued)

OTHER PUBLICATIONS

"Walzlager" ["Rolling Bearings"], Schaeffler Catalog dated Oct. 2008, pp. 393 and 396.

*Primary Examiner* — James Pilkington
(74) *Attorney, Agent, or Firm* — Antun M. Peakovic

(57) ABSTRACT

Angular contact roller bearings include an inner bearing ring with an inner raceway, which is arranged on the outer shell surface of the inner bearing ring so as to be inclined with respect to the bearing axis of rotation. An outer bearing ring has an outer raceway, which is arranged on the inner shell surface of the outer bearing ring so as to be inclined with respect to the bearing axis of rotation. An integrally formed rim delimits each, and a multiplicity of roller-type rolling bodies are arranged between the bearing rings and roll on the raceways of the bearing rings and are held with uniform spacings to one another in a circumferential direction by a bearing cage.

11 Claims, 10 Drawing Sheets

(51) Int. Cl.
*F16C 19/22* (2006.01)
*F16C 33/36* (2006.01)
*F16C 33/58* (2006.01)
*F16C 33/46* (2006.01)
*F16C 33/49* (2006.01)
*F16C 43/08* (2006.01)
*F16C 9/02* (2006.01)

(52) U.S. Cl.
CPC ........ *F16C 33/4605* (2013.01); *F16C 33/495* (2013.01); *F16C 33/585* (2013.01); *F16C 43/06* (2013.01); *F16C 9/02* (2013.01); *F16C 33/586* (2013.01); *F16C 43/08* (2013.01)

(58) Field of Classification Search
CPC .. F16C 33/4605; F16C 33/464; F16C 33/465; F16C 33/497; F16C 33/498; F16C 33/585; F16C 43/06; F16C 43/08
See application file for complete search history.

(56) References Cited

U.S. PATENT DOCUMENTS

| | | | | |
|---|---|---|---|---|
| 2,699,366 | A | * | 1/1955 | Heinrich ............... F16C 33/782 384/482 |
| 3,606,504 | A | * | 9/1971 | Wojciechowski ...... F16C 19/40 384/551 |
| 3,989,326 | A | * | 11/1976 | Hormann ............... F16C 19/364 384/572 |
| 5,861,067 | A | | 1/1999 | Hetzner |
| 2010/0142873 | A1 | * | 6/2010 | Sugiura ................ F16J 15/3456 384/477 |
| 2011/0007993 | A1 | | 1/2011 | Doeppling et al. |
| 2011/0026866 | A1 | | 2/2011 | Doeppling et al. |
| 2015/0128396 | A1 | | 5/2015 | Motomura |

FOREIGN PATENT DOCUMENTS

| | | | |
|---|---|---|---|
| CN | 102135133 | A | 7/2011 |
| CN | 202391970 | U | 8/2012 |
| DE | 151483 | A1 | 5/1904 |
| DE | 168499 | A1 | 3/1906 |
| DE | 521398 | C | 3/1931 |
| DE | 1286829 | * | 1/1969 |
| DE | 6917609 | U | 9/1969 |
| DE | 2154545 | A1 | 5/1973 |
| DE | 2407477 | A1 | 8/1975 |
| DE | 2420210 | A1 | 10/1975 |
| DE | 2651827 | A1 | 5/1978 |
| DE | 3004672 | A1 | 8/1981 |
| DE | 8713057 | U1 | 11/1987 |
| JP | S58130120 | U | 9/1983 |
| JP | 2006177507 | A | 7/2006 |
| JP | 2014228136 | A | 12/2014 |

* cited by examiner

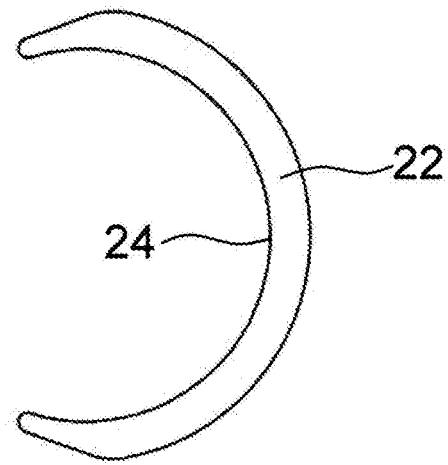
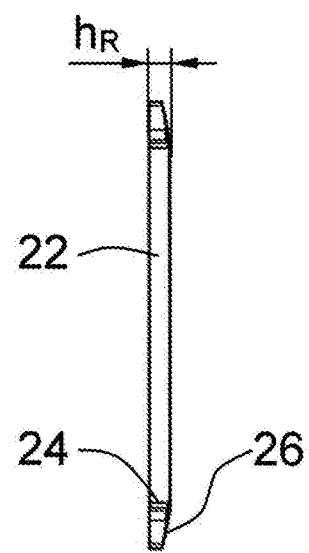
Fig. 10a  Fig. 10b
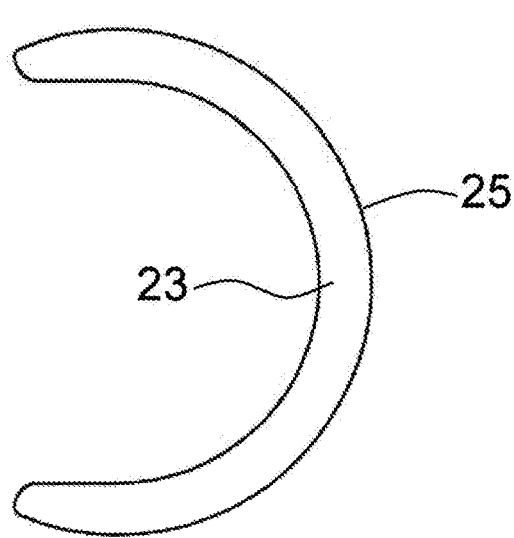
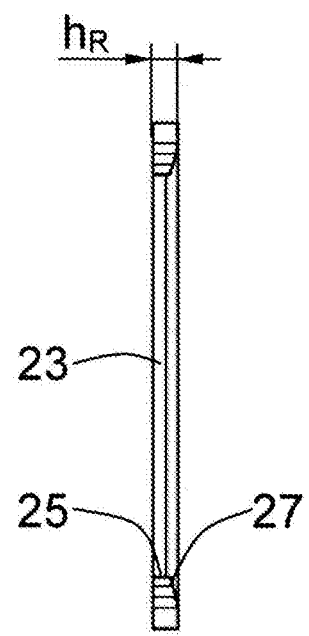
Fig. 11a  Fig. 11b

ANGULAR CONTACT ROLLER BEARING AND METHOD AND DEVICE FOR THE ASSEMBLY THEREOF

CROSS-REFERENCE TO RELATED APPLICATIONS

This application is the U.S. National Phase of PCT Appln. No. PCT/DE2016/200353 filed Aug. 3, 2016, which claims priority to DE 102015214847.5 filed Aug. 4, 2015, the entire disclosures of which are incorporated by reference herein.

TECHNICAL FIELD

The disclosure relates to an angular contact roller bearing, which angular contact roller bearing can be used particularly advantageously for the mounting of the crankshaft in a motor vehicle internal combustion engine. The disclosure furthermore relates to two variants of a method and a device for assembling the angular contact roller bearing.

BACKGROUND

The bearing type most commonly used for the mounting of the crankshaft in motor vehicle internal combustion engines is the single-row deep-groove ball bearing, because this is distinguished by uniformly high radial and axial load capacities and has the highest rotational speed limits of all bearing types owing to its low friction. Said deep-groove ball bearing is, in a known manner, composed of an outer bearing ring and of an inner bearing ring and of a multiplicity of bearing balls arranged between the bearing rings, which bearing balls roll in groove-like raceways formed into the inner side of the outer bearing ring and into the outer side of the inner bearing ring and are guided with uniform spacings to one another by means of a bearing cage. Here, the insertion of the bearing balls into the deep-groove ball bearing is normally performed using the eccentric assembly method that has become known from DE 168 499 A1, in which the two bearing rings are arranged eccentrically with respect to one another, the free space thus formed between the bearing rings is filled with the bearing balls, the bearing rings are subsequently moved into a concentric position with respect to one another utilizing their elasticity, and the bearing cage is inserted after the bearing balls have been uniformly circumferentially distributed.

In practice, however, it has been found that such deep-groove ball bearings, owing to the small maximum number of bearing balls that can be installed, which number is dependent on the dimensions of the inner and of the outer bearing ring and on the diameter of the bearing balls, are always subject to certain limits in particular with regard to the radial load capacity of the bearing. In the past, therefore, a multiplicity of solutions has been proposed, such as for example a non-closed filling opening arranged in the oppositely situated rims of the raceway of the outer and of the inner bearing ring, as per DE 151 483 A1, or a similarly designed closable filling opening, as per DE 24 07 477 A1, by means of which it has been sought to achieve an increase in the radial load capacity of deep-groove ball bearings through an increase in the number of bearing balls, though said solutions have not been able to become established in practice owing to the disadvantages resulting from such filling openings.

Another possibility for increasing the load capacity of the bearing arrangement of the crankshaft in a motor vehicle internal combustion engine would be to replace the previously used deep-groove ball bearing with a cylindrical roller bearing of the type NUP, such as is known for example from the applicant's catalogue "Wälzlager" ["Rolling bearings"], dated October 2008, on pages 393 and 396. Said cylindrical roller bearing has two lateral rims both on the inner bearing ring and on the outer bearing ring, and is suitable for accommodating high radial loads and axial loads in both directions. Such cylindrical roller bearings however have very high manufacturing costs owing to the high level of cutting machining, in particular for the raceway production and for the rim machining, and would furthermore in turn be over-dimensioned in terms of their load capacity, such that they are ultimately unsuitable for use as fixed bearings in motor vehicle manual transmissions.

A further bearing type which is suitable for the mounting of the crankshaft in a motor vehicle internal combustion engine and which forms the closest prior art for the present disclosure and whose capacity for accommodating radial forces and axial forces in both directions is greater than that of deep-groove ball bearings has become known from the documents DE 6 917 609 U and CH 463 886 A. Said documents each disclose an angular contact roller bearing which is composed substantially of an inner bearing ring with an inner raceway, which is arranged on the outer shell surface of said inner bearing ring obliquely with respect to the radial bearing axis, and of a rim which delimits said raceway at its smallest diameter, of an outer bearing ring with outer raceway, which is arranged on the inner shell surface of said outer bearing ring, likewise obliquely with respect to the radial bearing axis, and of a rim which delimits said raceway at its greatest diameter, and of a multiplicity of roller-type rolling bodies which are arranged between the bearing rings and which roll on the raceways of said bearing rings and which are held with uniform spacings to one another in a circumferential direction by means of a bearing cage. To permit the insertion of the rolling bodies in the form of tapered rollers into the bearing cage which is formed in each case as a pocket-type or window-type cage, it is the case that the rim on the inner bearing ring in the case of the angular contact roller bearing as per DE 6 917 609 U, and the rim on the outer bearing ring in the case of the angular contact roller bearing as per CH 463 886 A, is formed as a separate component which is fastened to the inner or outer bearing ring respectively after the bearing assembly process. This is performed, in the case of the angular contact roller bearing as per DE 6 917 609 U, through a separate slotted ring which is U-shaped in cross section and the radial limbs of which engage in to corresponding grooves in the rim and in the inner bearing ring, and in the case of the angular contact roller bearing as per CH 463 886 A, through an encircling collar integrally formed on the underside of the rim, which collar is pressed into the outer bearing ring.

In such angular contact roller bearings, although the fact that only one of the bearing rings is formed integrally with only one lateral rim has the effect that the level of cutting machining during the raceway production and during the rim machining, and thus also the overall costs for the bearing manufacture, are much lower than in the case of the cylindrical roller bearing described above, it is nevertheless the case in such angular contact roller bearings that the formation of the rim on the respective other bearing ring as a separate rim disk, the additional installation thereof on said bearing ring and the required precision manufacture of the contact surfaces on said rim disk and on the associated bearing ring have an adverse effect on the production costs thereof. Furthermore, in the case of such angular contact roller bearings, there is the risk that the fastening of the separate rim disk is not sufficient to withstand even high radial or axial load peaks, such that the rim disk can become detached during bearing operation, ultimately resulting in bearing failure.

SUMMARY

Proceeding from the discussed disadvantages of the solutions of the known prior art, it is therefore an object of the disclosure to design an in particular single-row angular contact roller bearing which has a greater radial and axial load capacity than a deep-groove ball bearing and which is distinguished by a low level of cutting machining for the raceway and rim production and by low assembly outlay and thus by low overall costs for the bearing manufacture.

According to the disclosure, said object is achieved in the case of an angular contact roller bearing as described herein firstly in that the outer shell surface of the inner bearing ring and the inner shell surface of the outer bearing ring are, in each case outside the raceways, of cylindrical form so as to run coaxially with respect to the bearing axis of rotation at least in sections, and the raceways of the two bearing rings are each formed in conical fashion into the shell surfaces, and in that the rims which are thus formed and which delimit the raceways in each case on one side are thus each formed integrally with the bearing rings.

Additional embodiments and advantageous refinements of the angular contact roller bearing designed according to the disclosure are also described.

Accordingly, in one embodiment, it is provided in the angular contact roller bearing designed according to the disclosure that the roller-type rolling bodies are preferably formed as tapered rollers which have a taper angle in the range from 1° to 4°, and which roll with an envelope circle angle of between 3° and 7° on their raceways. In the case of the radial rolling bearing designed according to the disclosure being used for the mounting of the crankshaft in a motor vehicle internal combustion engine, a taper angle of 1.5° to 2.5°, preferably of 2°, and an envelope circle angle of 5.5° to 6.5°, preferably of 6°, have proven to be particularly suitable here owing to the radial and axial loads that arise. It must however be noted that the design according to the disclosure is not intended to be restricted to a tapered roller bearing, because it is equally also possible for other roller bearings with roller axes arranged obliquely with respect to the bearing central axis to be designed in this way. Thus, instead of the tapered rollers mentioned by way of example, use may also be made of cylindrical rollers or needles or rollers with spherical shell surfaces, such as self-aligning rollers or barrel-type rollers.

In another feature of the angular contact roller bearing designed according to the disclosure, the gap between the outer shell surface of the inner bearing ring and the inner shell surface of the outer bearing ring is dimensioned such that two times the dimension of said gap is greater than the greatest diameter of the roller-type rolling bodies. Such dimensioning of the gap between the inner and the outer bearing ring is necessary in order to permit the insertion of the roller-type rolling bodies into the angular contact roller bearing in accordance with the assembly method described further below.

The angular contact roller bearing designed according to the disclosure may furthermore include that both the rim which delimits the raceway in the inner bearing ring and the rim which delimits the raceway in the outer bearing ring have an equal minimum height of 18% to 22%, preferably of approximately 20%, of the greatest diameter of the roller-type rolling bodies. By such a design of the rims and the associated raceway depth, it is ensured that high axial forces in one direction which arise during bearing operation can be accommodated with the least possible rim friction, whereas relatively low axial forces in the other direction are accommodated by the oblique raceways.

In a further refinement of the angular contact roller bearing designed according to the disclosure, the bearing cage is preferably formed by a comb-type cage which is insertable into the angular contact rolling bearing after the installation of the roller-type rolling bodies and which is composed of a cage ring and of a multiplicity of axial cage webs. Said bearing cage additionally has, on its cage webs, multiple uniformly circumferentially distributed detent webs by which the bearing cage is axially fixable in position either on the inner surface of the rim on the outer bearing ring or on the inner of the rim on the inner bearing ring. Said detent webs are integrally formed on the cage webs so as to be inclined with respect to the bearing central axis analogously to the roller axes of the roller-type rolling bodies and, during the insertion of the bearing cage into the angular contact roller bearing, are firstly elastically deformed in the direction of the cage webs until said detent webs engage with detent action with their free ends behind the rim on the outer bearing ring, in the case of the bearing cage being inserted from the large diameter side of the tapered rollers, and engage with detent action with their free ends behind the rim on the inner bearing ring, in the case of the bearing cage being inserted from the small diameter side of the tapered rollers. In this way, the bearing cage, which was hitherto fixed in position only in one axial direction as a result of the abutment of the bearing cage against one of the face sides of the roller-type rolling bodies, is also fixed in position in the other axial direction. Here, too, however, it must be noted that the use of a comb-type cage as a bearing cage is not restricted to said cage type, because it is also possible for the bearing cage to be formed as a two-part plate rivet cage.

In another refinement of the angular contact roller bearing designed according to the disclosure, it is also proposed that said angular contact roller bearing is sealed off against contamination from the outside, and against the escape of lubricant that has possibly been introduced into the bearing interior space, by two elastomer sealing disks which are inserted, axially on both sides of the roller-type rolling bodies, into encircling fastening grooves in the inner shell surface of the outer bearing ring and which have metal reinforcement. This design which is known per se in other rolling bearing types is of note because, in the case of the angular contact roller bearings described as the closest prior art in the introduction, owing to the absence of suitable fastening surfaces and suitable sealing surfaces for such elastomer sealing disks, no such sealing is possible. Owing to the planar form of the outer shell surface of the inner bearing ring and of the inner shell surface of the outer bearing ring, the required fastening and sealing surfaces are however provided in the case of the angular contact roller bearing designed according to the disclosure.

The stated object is furthermore achieved, in the case of an angular contact roller bearing design according to the disclosure, by an assembly method as described herein, which is distinguished by the fact that the angular contact roller bearing is assembled in accordance with an eccentric assembly method known per se as an assembly method for deep-groove ball bearings.

In a variant of said eccentric assembly method, in a first step, the inner bearing ring is placed, with its face side formed with the rim, onto a horizontal assembly plane with a convex sickle-shaped auxiliary ramp in such a way that said inner bearing ring bears with its rim against the inner diameter side of the auxiliary ramp. Subsequently, in a second step, the outer bearing ring is arranged, with its face side formed with the rim upward, eccentrically with respect to the inner bearing ring such that, at one side, the auxiliary ramp is arranged between the bearing rings and, at the other side, offset 180° with respect to the center of the auxiliary ramp, the bearing rings bear against one another. Then, as a third step, the sickle-shaped free space formed between the outer bearing ring and the inner bearing ring is filled with the roller-type rolling bodies in the form of tapered rollers such that the relatively small face sides of said roller-type rolling bodies lie on the oblique side of the auxiliary ramp.

Another variant of the eccentric assembly method differs from the first variant in that, in a first step, the outer bearing ring is placed, with its face side formed with the rim, onto a horizontal assembly plane with a convex sickle-shaped auxiliary ramp in such a way that said outer bearing ring bears with its rim against the outer diameter side of the auxiliary ramp. Subsequently, in a second step, the inner bearing ring is arranged, with its face side formed with the rim upward, eccentrically with respect to the outer bearing ring such that, at one side, the auxiliary ramp is arranged between the bearing rings and, at the other side, offset 180° with respect to the center of the auxiliary ramp, the bearing rings bear against one another. Then, the third step of said variant consists again in that the sickle-shaped free space formed between the inner bearing ring and the outer bearing ring is filled with the roller-type rolling bodies in the form of tapered rollers such that the relatively large face sides of said roller-type rolling bodies lie on the oblique side of the auxiliary ramp.

Independently of the two variants of the eccentric assembly method, in a fourth step, the outer bearing ring may be clamped, at the level of the contact point with the inner bearing ring and at the level of a point on the outer shell surface of said outer bearing ring which is offset 180° with respect to the contact point, such that the outer bearing ring is slightly ovalized within its elasticity limit. Subsequently, in a fifth step, the inner bearing ring may be displaced into a coaxial position with respect to the outer bearing ring, and the roller-type rolling bodies are uniformly circumferentially distributed in their raceways in the bearing rings, with the ovalization of the outer bearing ring being eliminated.

In the case of the first variant of the eccentric assembly method according to the disclosure being implemented, it is subsequently the case that, in a sixth step, the bearing cage in the form of a comb-type cage may be inserted with its cage webs between the roller-type rolling bodies from the side with the relatively small face sides of said roller-type rolling bodies, and said bearing cage is engaged with detent action against the inner surface of the rim on the inner bearing ring. In the case of the second variant of the eccentric assembly method according to the disclosure being implemented, it is by contrast the case, that, in a sixth step, the bearing cage in the form of a comb-type cage may be inserted with its cage webs between the roller-type rolling bodies from the side with the relatively large face sides of said roller-type rolling bodies, and said bearing cage is engaged with detent action against the inner surface of the rim on the outer bearing ring.

According to another embodiment, it is then the case, as a conclusion to the eccentric assembly method according to the disclosure, that, in a final step, the bearing interior space is filled with lubricant, and the two elastomer sealing disks are inserted into the encircling fastening grooves in the inner shell surface of the outer bearing ring.

Finally, the stated object may also be achieved, in the case of an angular contact roller bearing designed according to the disclosure, by two variants of a device for carrying out the described assembly method.

Here, to carry out the first variant of the eccentric assembly method according to the disclosure, it is proposed that the auxiliary ramp which bears with its inner diameter side against the inner bearing ring has an oblique side, which tapers toward the outer bearing ring with the angle of inclination of the raceway in the inner bearing ring, and a maximum ramp height which corresponds to the rim height on the inner bearing ring. To carry out the second variant of the eccentric assembly method according to the disclosure, it is by contrast proposed that the auxiliary ramp which bears with its outer diameter side against the outer bearing ring has an oblique side, which tapers toward the inner bearing ring with the angle of inclination of the raceway in the outer bearing ring, and a maximum ramp height which corresponds to the rim height on the outer bearing ring.

In summary, the angular contact roller bearing designed according to the disclosure thus has the advantage in relation to the angular contact roller bearings known from the prior art that, despite the maximum rolling body fill factor of approximately 60% that is achievable with the eccentric assembly method, it has a greater load capacity than a similarly assembled single-row deep-groove ball bearing, because the roller-type rolling bodies that are used are in linear contact with their raceways rather than in punctiform contact as in the case of bearing balls. With regard to the achievable load capacity, an angular contact roller bearing designed according to the disclosure ranks here as a completely new bearing type [e.g. type series ARU (Angular Roller Unit) 207=40 kN] approximately in the middle between the load capacity of a single-row deep-groove ball bearing [e.g. type series 6207=25.5 kN] and the load capacity of a single-row cylindrical roller bearing [e.g. type series NUP 207E=56 kN]. Furthermore, owing to the singly conical raceways formed into the cylindrical inner and outer shell surfaces of the two bearing rings, the level of cutting machining during the production and machining of the raceways and of the rims of the angular contact roller bearing according to the disclosure falls within manageable cost limits, and, owing to the rims formed here, which are formed integrally with the bearing rings, there is at the same time no longer a need for separate rim disks. In conjunction with the eccentric assembly method for the roller-type rolling bodies and with the comb-type cage that is used, the angular contact roller bearing according to the disclosure is thus distinguished overall by a low level of assembly outlay and thus by low overall costs for the bearing manufacture.

BRIEF DESCRIPTION OF THE DRAWINGS

An embodiment of the angular contact roller bearing designed according to the disclosure and two alternative variants of the method for the assembly thereof and two associated devices for carrying out said method variants will be discussed in more detail below with reference to the appended drawings, in which:

FIGS. 10a, 10b show an illustration of the auxiliary ramp for carrying out the first variant of the assembly method according to the disclosure in a plan view and in a sectional view; and FIGS. 11a, 11b show an illustration of the auxiliary ramp for carrying out the second variant of the assembly method according to the disclosure in a plan view and in a sectional view.

DETAILED DESCRIPTION

Figure 1:
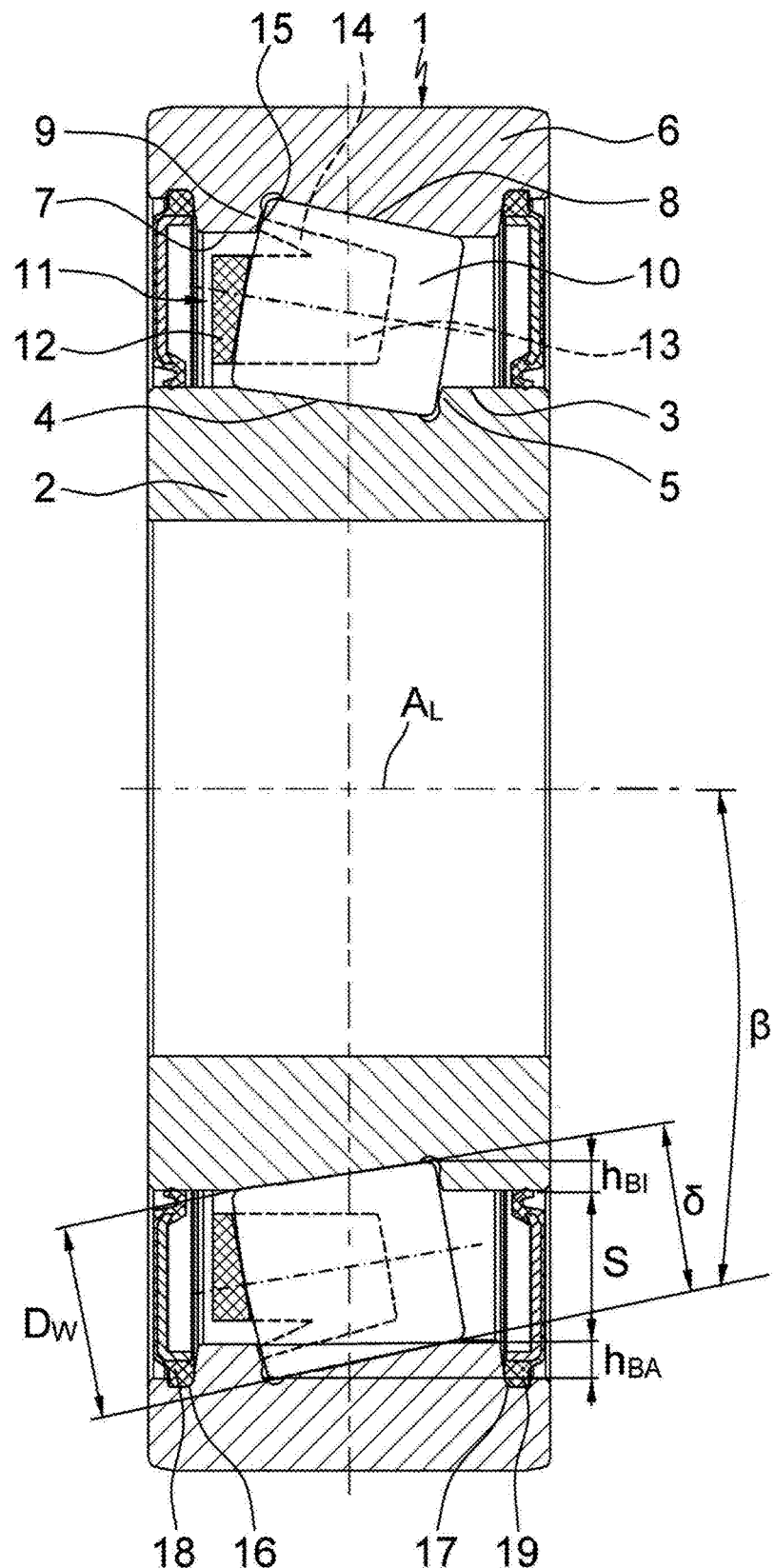
FIG. 1 shows an enlarged illustration of a cross section through an angular contact roller bearing designed according to the disclosure.

FIG. 1 illustrates a cross section through a single-row angular contact roller bearing which is suitable for example as a replacement for the previously used deep-groove ball bearing for the mounting of the crankshaft in motor vehicle internal combustion engines. As can be clearly seen, said angular contact roller bearing 1 is composed of an inner bearing ring 2 with an inner raceway 4, which is arranged on the outer shell surface 3 of said inner bearing ring so as to be inclined with respect to the bearing axis of rotation AL and which is delimited at its smallest diameter by a rim 5, and of an outer bearing ring 6 with an outer raceway 8, which is arranged on the inner shell surface 7 of said outer bearing ring likewise so as to be inclined with respect to the bearing axis of rotation AL and which is delimited at its greatest diameter by a rim 9. Furthermore, between the bearing rings 2, 6, there is arranged a multiplicity of roller-type rolling bodies 10 which roll on the raceways 4, 8 of said bearing rings and which are held with uniform spacings to one another in a circumferential direction by a bearing cage 11.

It can furthermore be seen in FIG. 1 that the outer shell surface 3 of the inner bearing ring 2 and the inner shell surface 7 of the outer bearing ring 6 are, in each case outside the raceways 4, 8, of cylindrical form so as to run coaxially with respect to the bearing axis of rotation AL, and the raceways 4, 8 of the two bearing rings 2, 6 are each formed in conical fashion into the cylindrical shell surfaces 3, 7. The rims 5, 9 which are thus formed and which delimit the raceways 4, 8 in each case on one side are thus each formed integrally with the bearing rings 2, 6.

It can likewise be seen in FIG. 1 that the roller-type rolling bodies 10 are formed as tapered rollers which have a taper angle δ preferably of 2° and which roll with an envelope circle angle β preferably of 6° on their raceways 4, 8. Furthermore, the gap S between the outer shell surface 3 of the inner bearing ring 2 and the inner shell surface 7 of the outer bearing ring 6 is dimensioned such that two times the dimension of said gap is greater than the greatest diameter DW of the roller-type rolling bodies 10, in order to permit the insertion of the roller-type rolling bodies 10 into the radial rolling bearing 1 in accordance with the assembly method described in more detail below. Furthermore, both the rim 5 which delimits the raceway 4 in the inner bearing ring 2 and the rim 9 which delimits the raceway 8 in the outer bearing ring 6 have an equal minimum height $h_{BI}$, $h_{BA}$ of approximately 20%, of the greatest diameter DW of the roller-type rolling bodies 10, in order to enable high axial forces in one direction that arise during bearing operation to be accommodated with the least possible rim friction.

It can also be seen in FIG. 1 that the bearing cage 11 is preferably formed by a comb-type cage which is insertable into the radial rolling bearing 1 after the installation of the roller-type rolling bodies 10. Here, the bearing cage 11, which is composed of a cage ring 12 and of a multiplicity of axial cage webs 13, has, on its cage webs 13 (obscured in the illustration), multiple uniformly circumferentially distributed detent webs 14 (likewise obscured in the illustration), which run so as to be inclined with respect to the bearing axis of rotation AL and by which the bearing cage 11 is axially fixable in position on the inner surface 15 of the rim 9 on the outer bearing ring 6.

Finally, it can also be seen in FIG. 1 that the radial rolling bearing 1 is sealed off against contamination from the outside, and against the escape of lubricant that has possibly been introduced into the bearing interior space 20, by two elastomer sealing disks 18, 19 which are inserted, axially on both sides of the roller-type rolling bodies 10, into encircling fastening grooves 16, 17 in the inner shell surface 7 of the outer bearing ring 6 and which have metal reinforcement. This design which is known per se in other rolling bearing types is possible in the case of the radial rolling bearing 1 according to the disclosure, by contrast to known angular contact roller bearings, only because said radial rolling bearing 1 according to the disclosure, by the radially planar form of the outer shell surface 3 of the inner bearing ring 2 and of the inner shell surface 7 of the outer bearing ring 6, has suitable fastening surfaces and suitable sealing surfaces for such elastomer sealing disks 18, 19.

Figure 2A:
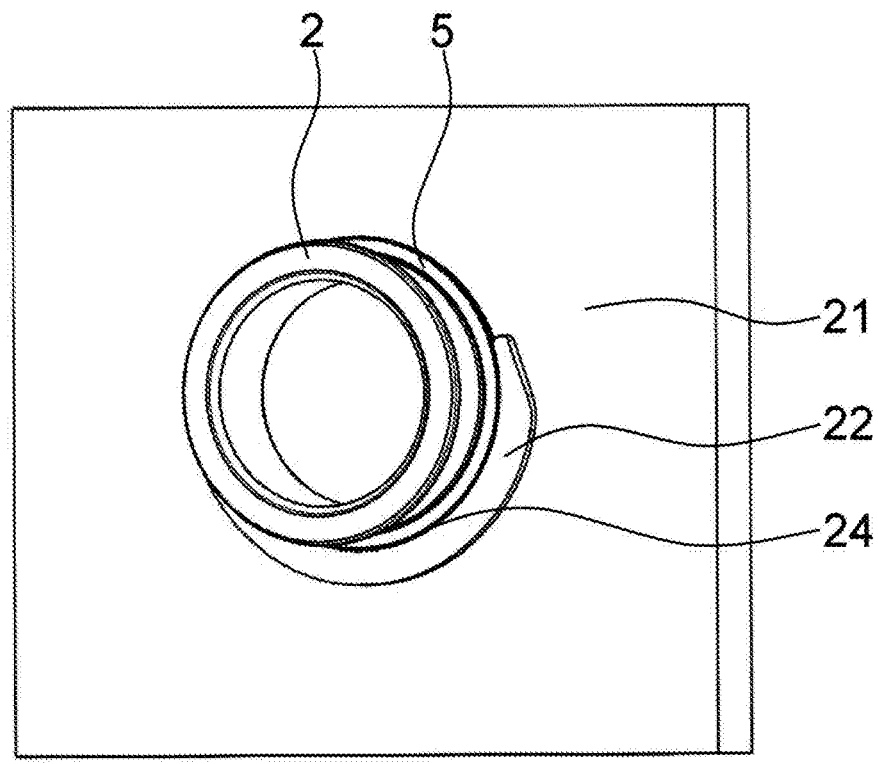
FIGS. 2a, 2b show an illustration of the first step of the first variant of the assembly method according to the disclosure in a plan view and in a sectional view.
Figure 2B:
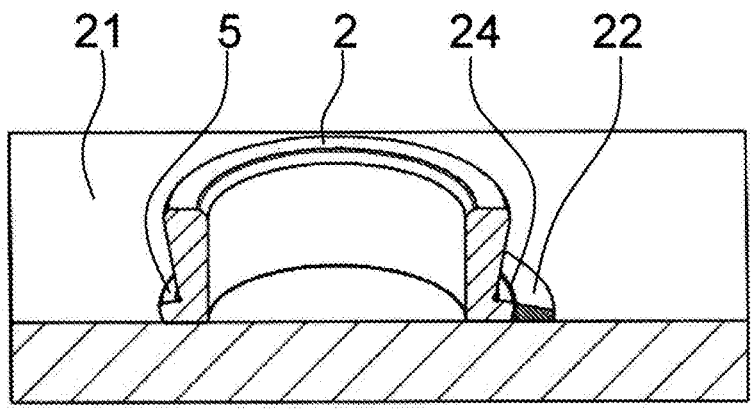

FIGS. 2a, 2b, 3a, 3b and 4a, 4b furthermore schematically illustrate the first steps of a first variant of an assembly method for the angular contact roller bearing 1 according to the disclosure. Said assembly method is substantially a modified eccentric assembly method known per se as an assembly method for deep-groove ball bearings, in the case of which, as can be seen in FIGS. 2a and 2b, in a first step, the inner bearing ring 2 is placed, with its face side formed with the rim 5, onto a horizontal assembly plane 21 with a convex sickle-shaped auxiliary ramp 22 in such a way that said inner bearing ring bears with its rim 5 against the inner diameter side 24 of the auxiliary ramp 22.

Figure 3A:
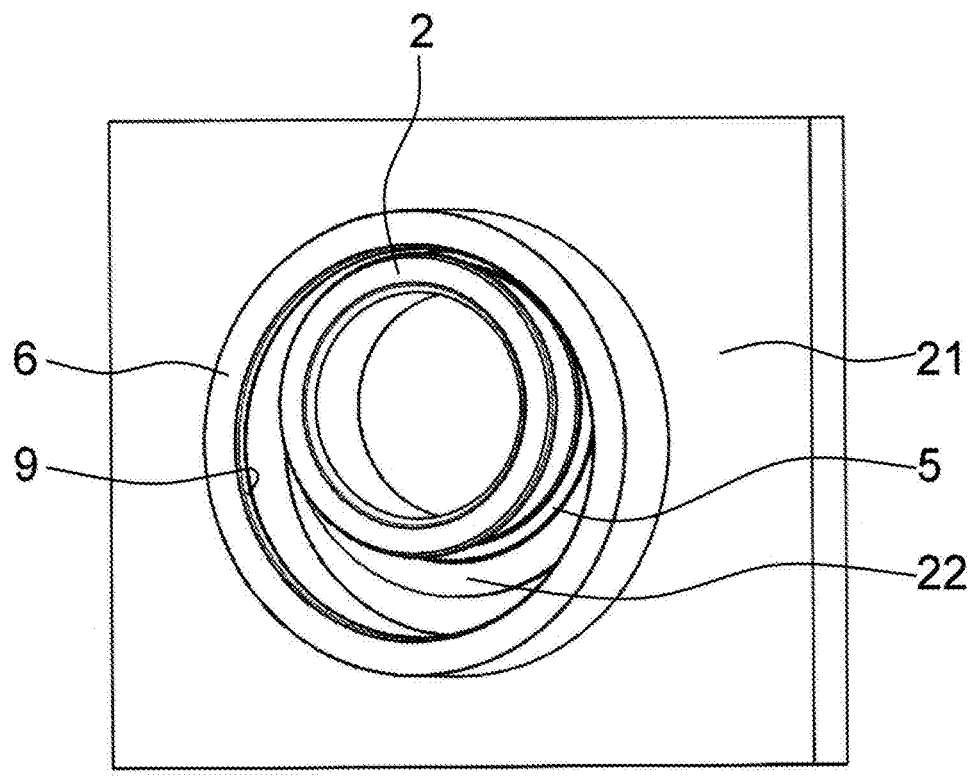
FIGS. 3a, 3b show an illustration of the second step of the first variant of the assembly method according to the disclosure in a plan view and in a sectional view.
Figure 3B:
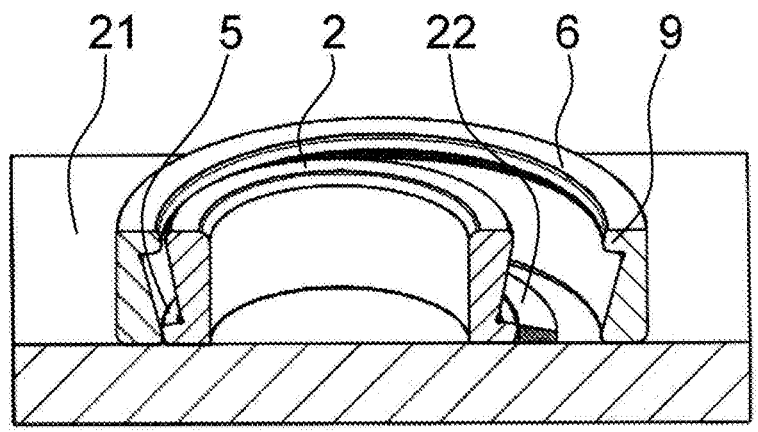

Subsequently, in a second step, the outer bearing ring 6 is arranged, with its face side formed with the rim 9 upward, eccentrically with respect to the inner bearing ring 2 such that, as can be clearly seen in FIGS. 3a and 3b, at one side, the auxiliary ramp 22 is arranged between the bearing rings 2, 6 and, at the other side, offset 180° with respect to the center of the auxiliary ramp 22, the bearing rings 2, 6 bear against one another.

Figure 4A:
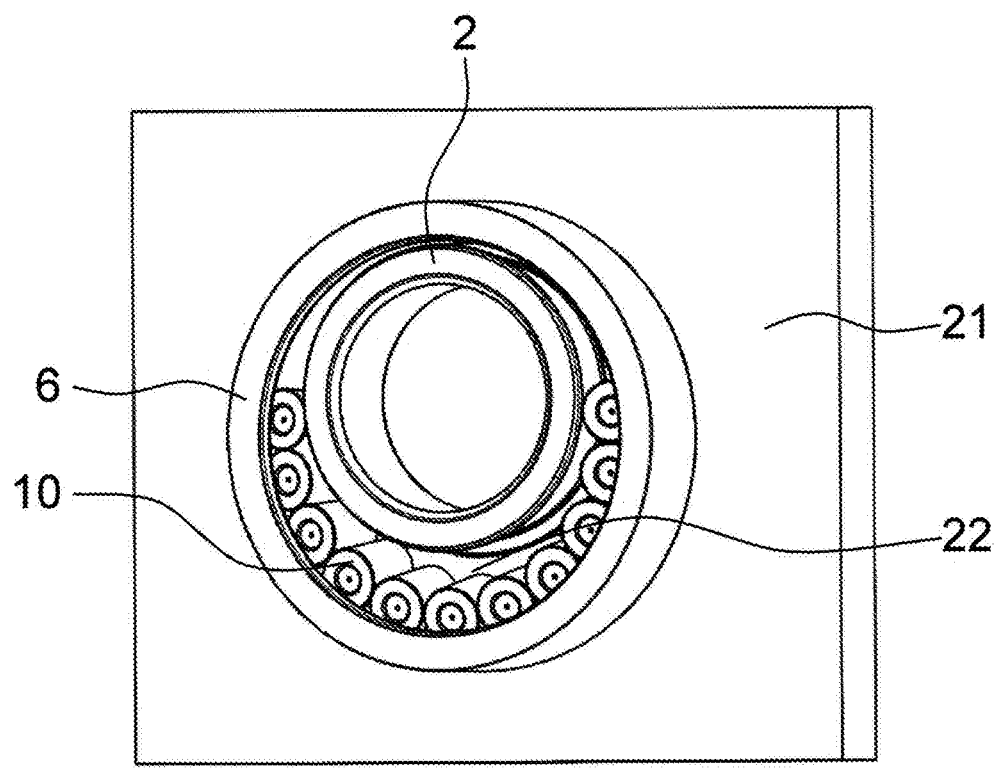
FIGS. 4a, 4b show an illustration of the third step of the first variant of the assembly method according to the disclosure in a plan view and in a sectional view.
Figure 4B:
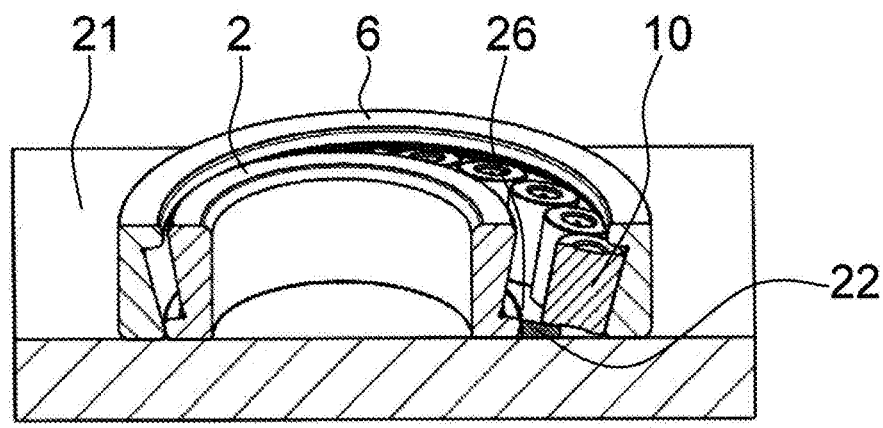

In a third step illustrated in FIGS. 4a and 4b, the sickle-shaped free space formed between the outer bearing ring 6 and the inner bearing ring 2 is filled with the roller-type rolling bodies 10 in the form of tapered rollers such that the relatively small face sides of said roller-type rolling bodies lie on the oblique side 26 of the auxiliary ramp 22.

Figure 5A:
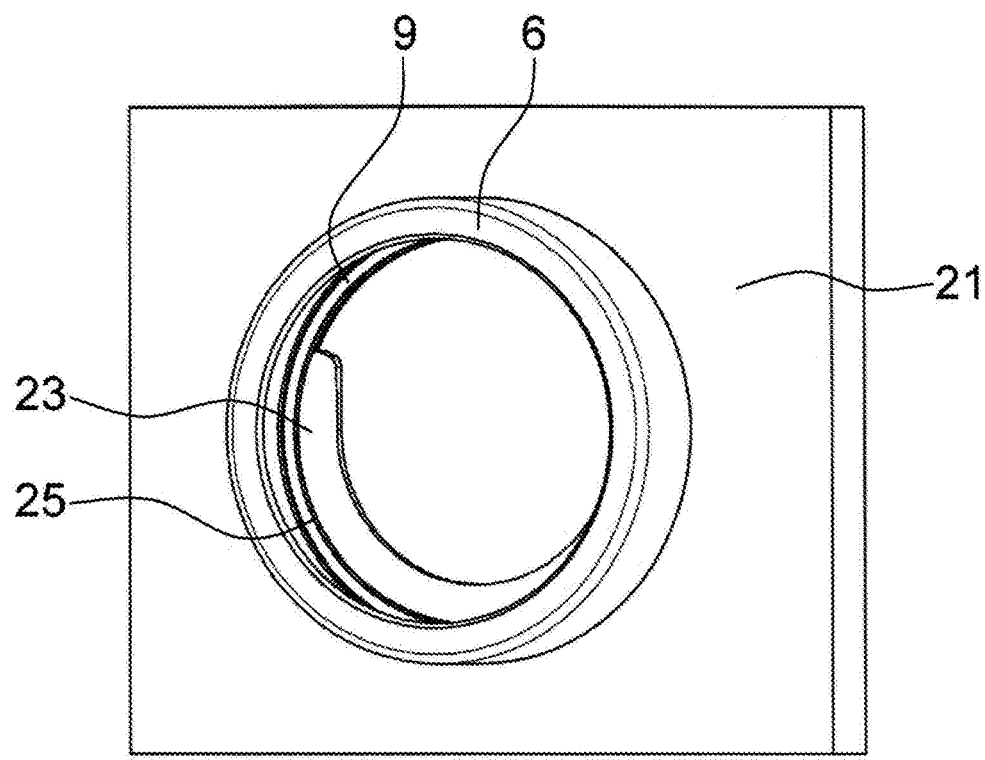
FIGS. 5a, 5b show an illustration of the first step of the second variant of the assembly method according to the disclosure in a plan view and in a sectional view.
Figure 5B:
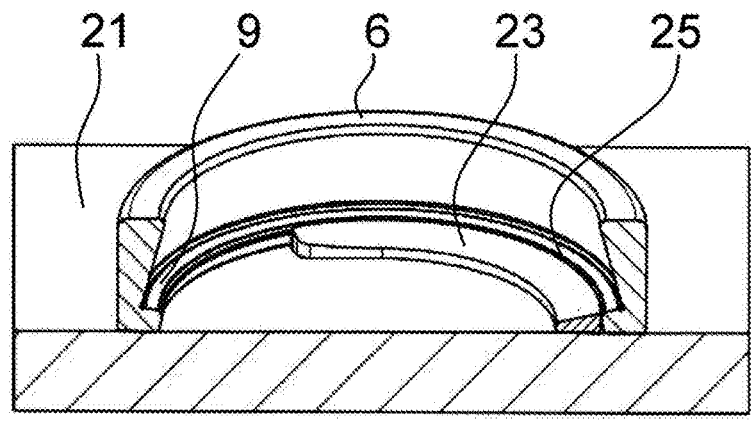

The second variant, illustrated in FIGS. 5a, 5b, 6a, 6b and 7a, 7b, of the assembly method for the angular contact roller bearing according to the disclosure is likewise a modified eccentric assembly method and differs from the first variant in that, in the first step shown in FIGS. 5a and 5b, in this case the outer bearing ring 6 is placed, with its face side formed with the rim 9, onto a horizontal assembly plane 21 with a convex sickle-shaped auxiliary ramp 23 in such a way that said outer bearing ring bears with its rim 9 against the outer diameter side 25 of the auxiliary ramp 23.

Figure 6A:
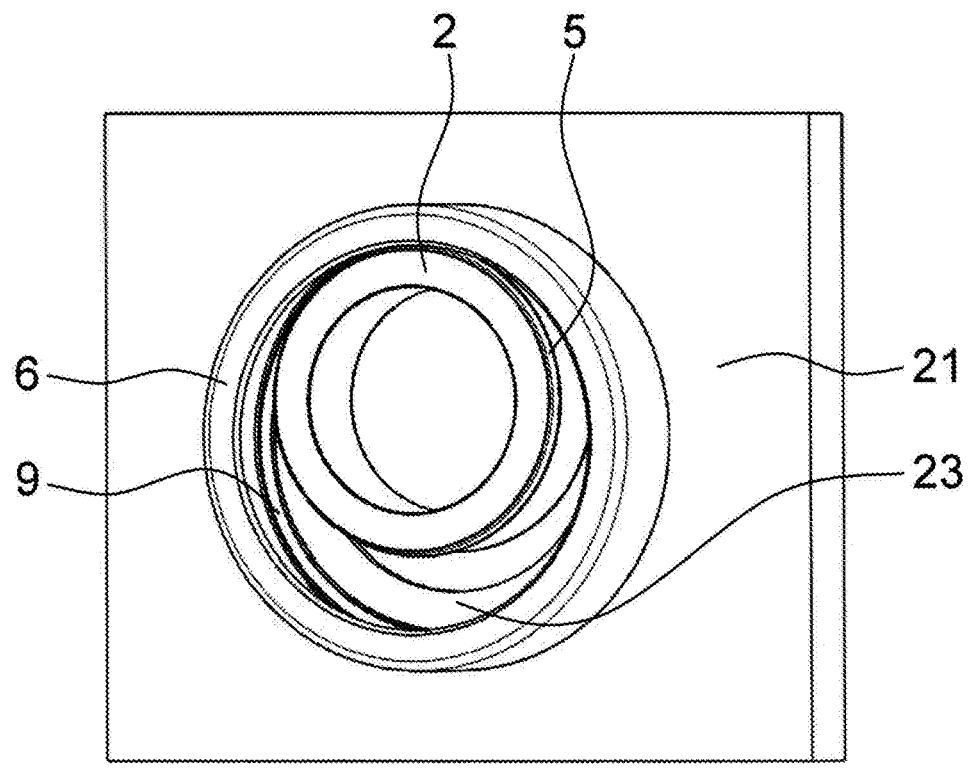
FIGS. 6a, 6b show an illustration of the second step of the second variant of the assembly method according to the disclosure in a plan view and in a sectional view.
Figure 6B:
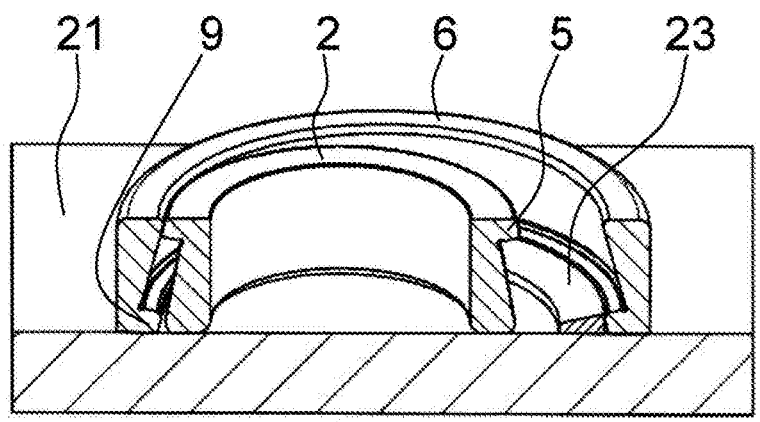

Similarly to the first variant, it is then the case in a second step that the inner bearing ring 2 is arranged, with its face side formed with the rim 5 upward, eccentrically with respect to the outer bearing ring 6 such that, as can be seen in FIGS. 6a and 6b, at one side, the auxiliary ramp 23 is arranged between the bearing rings 2, 6 and, at the other side, offset 180° with respect to the center of the auxiliary ramp 23, the bearing rings 2, 6 bear against one another.

Figure 7A:
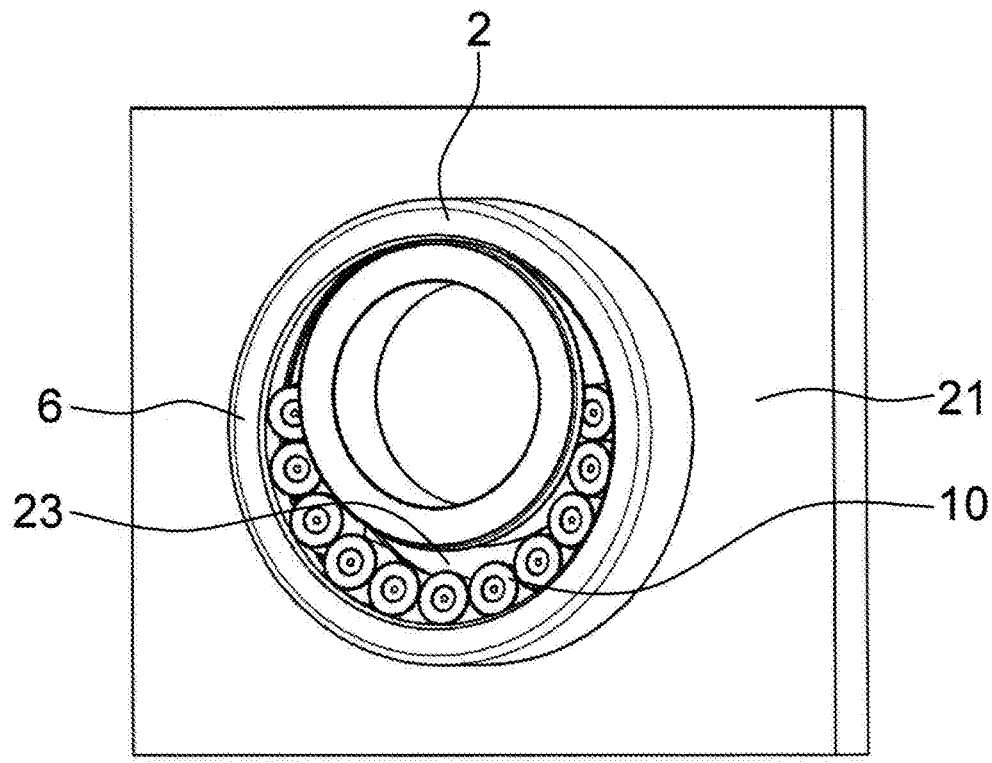
FIGS. 7a, 7b show an illustration of the third step of the second variant of the assembly method according to the disclosure in a plan view and in a sectional view.
Figure 7B:
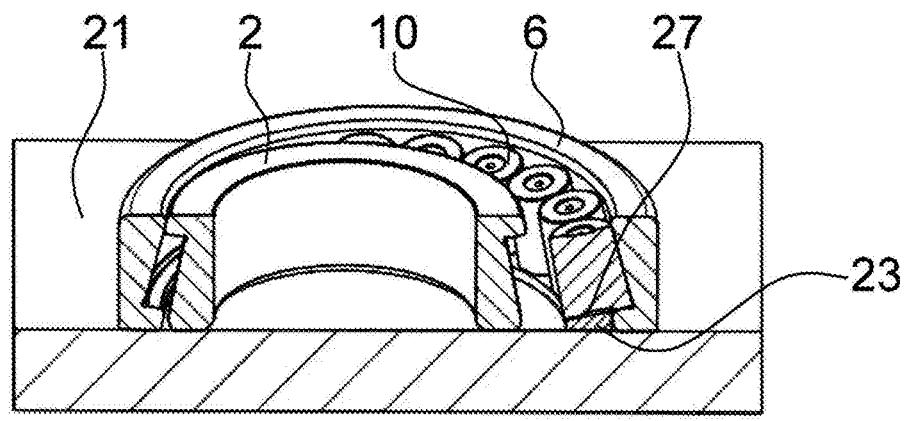

Then, in a third step illustrated in FIGS. 7a and 7b, it is the case here too that the sickle-shaped free space formed between the inner bearing ring 2 and the outer bearing ring 6 is filled with the roller-type rolling bodies 10 in the form of tapered rollers, but with the difference that, here, the relatively large face sides of said roller-type rolling bodies 10 lie on the oblique side 27 of the auxiliary ramp 23.

Figure 8A:
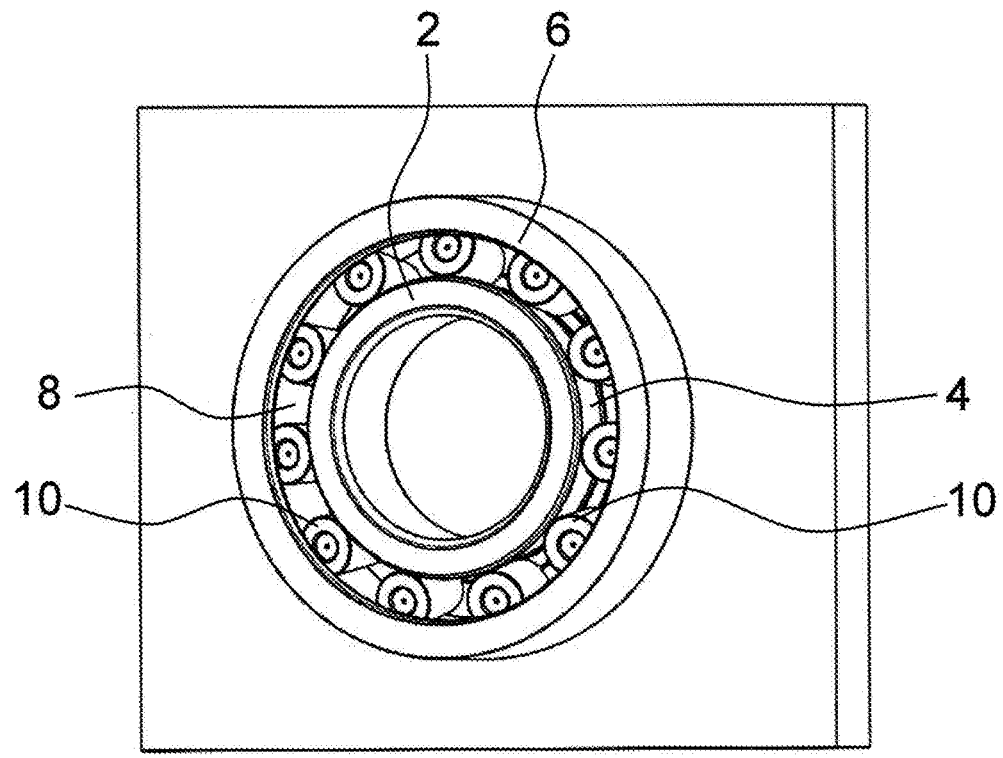
FIGS. 8a, 8b show an illustration of the fifth step of both variants of the assembly method according to the disclosure in a plan view and in a sectional view.
Figure 8B:
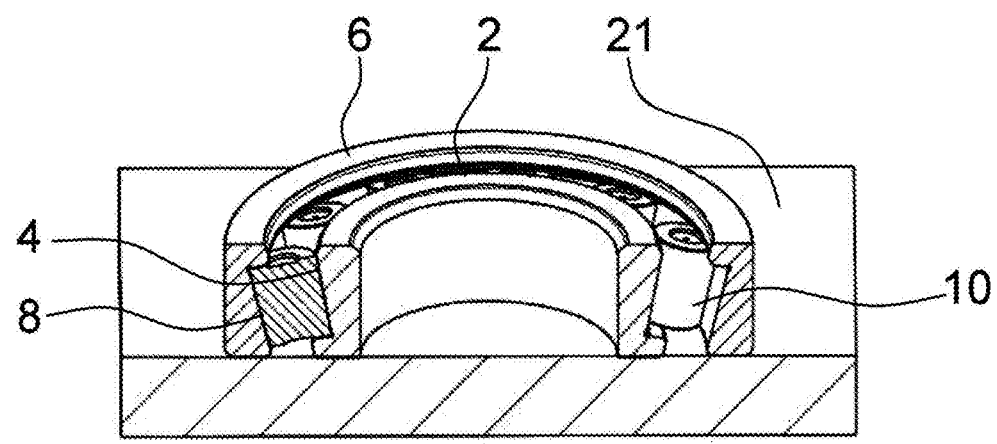

Independently of the two variants of the eccentric assembly method, it is then the case in a fourth step which is not illustrated in any more detail in the drawings that the outer bearing ring 3 is clamped, at the level of the contact point with the inner bearing ring 2 and at the level of a point on the outer shell surface of said outer bearing ring which is offset 180° with respect to the contact point, such that the outer bearing ring 3 is slightly ovalized within its elasticity limit. Subsequently, as can be seen from FIGS. 8a and 8b, in a fifth step, the inner bearing ring 2 is displaced into a coaxial position with respect to the outer bearing ring 3, and the roller-type rolling bodies 10 are uniformly circumferentially distributed in their raceways 4, 8 in the bearing rings 2, 6, with the ovalization of the outer bearing ring 3 being eliminated.

Figure 9A:
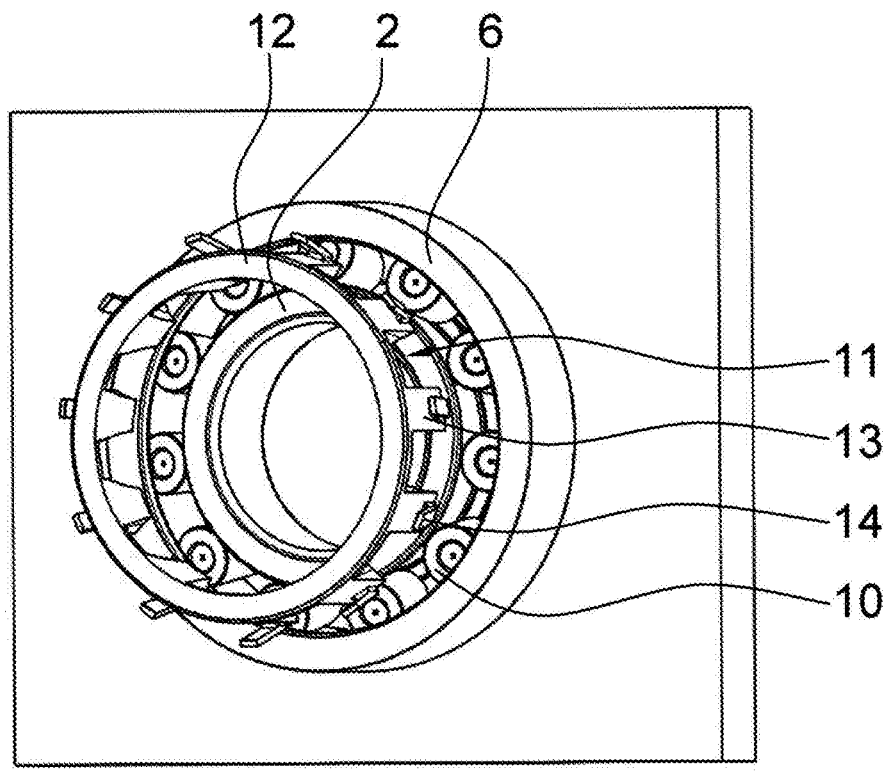
FIGS. 9a, 9b show an illustration of the sixth step of both variants of the assembly method according to the disclosure in a plan view and in a sectional view.
Figure 9B:
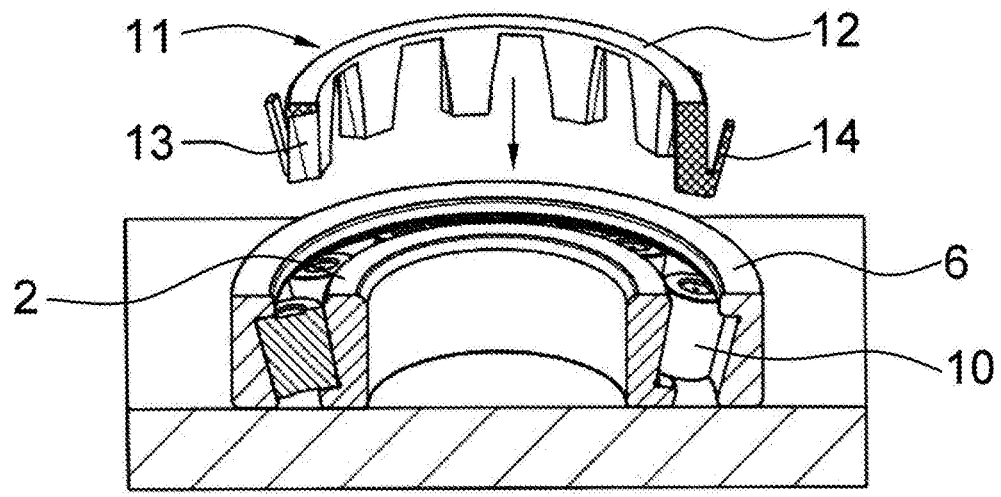

In the case of the first variant of the eccentric assembly method according to the disclosure being implemented, it is then the case in a sixth step, which for the sake of simplicity is however not illustrated in the drawings, that the bearing cage 11 in the form of a comb-type cage is inserted with its cage webs 13 between the roller-type rolling bodies 10 from the side with the relatively small face sides of said roller-type rolling bodies, and said bearing cage is engaged with its detent lugs with detent action against the inner surface of the rim 5 on the inner bearing ring 2. In the case of the second variant of the eccentric assembly method according to the disclosure being implemented, it is by contrast the case in a sixth step that the bearing cage 11 in the form of a comb-type cage is, as shown in FIGS. 9a and 9b, inserted with its cage webs 13 between the roller-type rolling bodies 10 from the side with the relatively large face sides of said roller-type rolling bodies, and, as shown in FIG. 1, said bearing cage is engaged with its detent webs 14 with detent action against the inner surface 15 of the rim 9 on the outer bearing ring 6. Finally, it is then also the case that the bearing interior space 20 is filled with lubricant, and the two elastomer sealing disks 18, 19 are inserted into the encircling fastening grooves 16, 17 in the inner shell surface 7 of the outer bearing ring 6 in the manner likewise illustrated in FIG. 1.

Finally, FIGS. 10a, 10b and 11a, 11b illustrate the auxiliary ramps 22 and 23 for carrying out the two variants of the eccentric assembly method according to the disclosure. Here, the auxiliary ramp 22 used for the first method variant is distinguished by the fact that it bears with its inner diameter side 24 against the inner bearing ring 6 and, as can be clearly seen in FIGS. 10a and 10b, has an oblique side 26, which tapers toward the outer bearing ring 3 with the angle of inclination of the raceway 4 in the inner bearing ring 2, and a maximum ramp height $h_R$ which corresponds to the rim height $h_{BI}$ on the inner bearing ring 2.

By contrast, the auxiliary ramp 23 used for the second method variant is distinguished by the fact that it bears with its outer diameter side 25 against the outer bearing ring 6 and, as can be seen in FIGS. 11a and 11b, has an oblique side 27, which tapers toward the inner bearing ring 2 with the angle of inclination of the raceway 8 in the outer bearing ring 6, and a maximum ramp height $h_R$ which corresponds to the rim height $h_{BA}$ on the outer bearing ring 6.

LIST OF REFERENCE DESIGNATIONS

1 Radial rolling bearing
2 Inner bearing ring
3 Outer shell surface of 2
4 Inner raceway in 2
5 Rim on 4
6 Outer bearing ring
7 Inner shell surface of 6
8 Outer raceway in 6
9 Rim on 8
10 Roller-type rolling body
11 Bearing cage
12 Cage ring of 11
13 Cage webs on 12
14 Detent webs on 13
15 Inner surface of 9
16 Fastening groove in 7
17 Fastening groove in 7
18 Elastomer sealing disk
19 Elastomer sealing disk
20 Bearing interior space
21 Assembly plane
22 Auxiliary ramp
23 Auxiliary ramp
24 Inner diameter side of 22
25 Outer diameter side of 23
26 Oblique side on 22
27 Oblique side on 23
AL Bearing axis of rotation
δ Taper angle
β Envelope circle angle
S Gap between 3 and 7
DW Greatest diameter of 10
$h_{BI}$ Rim height on 2
$h_{BA}$ Rim height on 6
$h_R$ Ramp height

The invention claimed is:
1. An angular contact roller bearing comprising:
an inner bearing ring with an inner raceway, which is arranged on an outer shell surface of said inner bearing ring so as to be inclined with respect to a bearing axis of rotation, said inner bearing ring having an integrally formed inner rim which delimits said inner raceway at its smallest diameter;
an outer bearing ring with an outer raceway, which is arranged on an inner shell surface of said outer bearing ring so as to be inclined with respect to the bearing axis of rotation, said outer bearing ring having an integrally formed outer rim which delimits said outer raceway at its greatest diameter; and a multiplicity of roller-type rolling bodies, each having a maximum diameter, which are arranged between the bearing rings and which roll on the raceways of said bearing rings and which are held with uniform spacings to one another in a circumferential direction by a bearing cage; and wherein the inner rim and the outer rim each have a height of 18% to 22% of the maximum diameter;

wherein the roller-type rolling bodies are formed as tapered rollers which have a taper angle in the range from 1° to 4°, and which roll with an envelope circle angle of between 3° and 7° on their raceways.

2. The angular contact roller bearing as claimed in claim 1, wherein a gap between the outer shell surface of the inner bearing ring and the inner shell surface of the outer bearing ring is dimensioned such that two times the dimension of said gap is greater than the maximum diameter of the roller-type rolling bodies.

3. The angular contact roller bearing as claimed in claim 1, wherein the bearing cage is formed by a comb-type cage which is insertable into the angular contact roller bearing after installation of the roller-type rolling bodies and which is composed of a cage ring and of a multiplicity of axial cage webs.

4. The angular contact roller bearing as claimed in claim 3, wherein the bearing cage has, on its cage webs, multiple uniformly circumferentially distributed detent webs which run so as to be inclined with respect to the bearing axis of rotation and by which the bearing cage is axially fixable in position on an inner surface of the outer rim.

5. The angular contact roller bearing as claimed in claim 1, wherein said angular contact roller bearing is sealed off against contamination from the outside, and against the escape of lubricant that has possibly been introduced into a bearing interior space, by two elastomer sealing disks which are inserted, axially on both sides of the roller-type rolling bodies, into encircling fastening grooves in the inner shell surface of the outer bearing ring and which have metal reinforcement.

6. A method for assembling an angular contact roller bearing comprising:

in a first step, placing an inner bearing ring onto a horizontal assembly plane with a convex sickle-shaped auxiliary ramp, said inner bearing ring having an inner raceway, which is arranged on an outer shell surface of said inner bearing ring so as to be inclined with respect to a bearing axis of rotation, said inner bearing ring having an inner rim which delimits said inner raceway at its smallest diameter, in such a way that said inner bearing ring bears with its rim against an inner diameter side of the auxiliary ramp;

in a second step, arranging an outer bearing ring eccentrically with the inner ring, said outer ring having an outer raceway, which is arranged on an inner shell surface of said outer bearing ring so as to be inclined with respect to the bearing axis of rotation, said outer bearing ring having an outer rim which delimits said outer raceway at its greatest diameter, a face side having the rim facing away from the horizontal assembly plane; and in a third step, filling a sickle-shaped free space formed between the outer bearing ring and the inner bearing ring with roller-type rolling bodies in the form of tapered rollers such that relatively small face sides of said roller-type rolling bodies lie on an oblique side of the auxiliary ramp.

7. The method as claimed in claim 6, wherein, in a fourth step, the outer bearing ring is clamped such that the outer bearing ring is slightly ovalized within its elasticity limit.

8. The method as claimed in claim 7, wherein, in a fifth step, the inner bearing ring is displaced into a coaxial position with respect to the outer bearing ring, and the roller-type rolling bodies are uniformly circumferentially distributed in their raceways in the bearing rings, with the ovalization of the outer bearing ring being eliminated.

9. A method for assembling an angular contact roller bearing comprising:

in a first step, placing an outer bearing ring onto a horizontal assembly plane with a convex sickle-shaped auxiliary ramp, said outer bearing ring having an outer raceway, which is arranged on an inner shell surface of said outer bearing ring so as to be inclined with respect to a bearing axis of rotation (AL), said outer bearing ring having an outer rim which delimits said outer raceway at its greatest diameter, in such a way that said outer bearing ring bears with its rim against an outer diameter side of the auxiliary ramp in a second step, arranging an inner bearing ring eccentrically with respect to the outer bearing ring, said inner bearing ring having an inner raceway, which is arranged on an outer shell surface of said inner bearing ring so as to be inclined with respect to the bearing axis of rotation, said inner bearing ring having an inner rim which delimits said inner raceway at its smallest diameter, such that, at one side, the auxiliary ramp is arranged between the bearing rings and, at the other side, offset 180° with respect to the center of the auxiliary ramp, the bearing rings bear against one another in a third step, filling a sickle-shaped free space formed between the outer bearing ring and the inner bearing ring with roller-type rolling bodies in the form of tapered rollers such that relatively large face sides of said roller-type rolling bodies lie on an oblique side of the auxiliary ramp.

10. The method as claimed in claim 9, wherein, in a fourth step, the outer bearing ring is clamped such that the outer bearing ring is slightly ovalized within its elasticity limit.

11. The method as claimed in claim 10, wherein, in a fifth step, the inner bearing ring is displaced into a coaxial position with respect to the outer bearing ring, and the roller-type rolling bodies are uniformly circumferentially distributed in their raceways in the bearing rings, with the ovalization of the outer bearing ring being eliminated.

* * * * *